United States Patent Office 3,572,143
Patented Mar. 23, 1971

3,572,143
SWITCHES DRIVEN BY STRETCHABLE ENERGY ACCUMULATORS OF THE CRANKSHAFT-SPRING TYPE
Gerardus A. van Riemsdijk, Nijmegen, Netherlands, assignor to Smit Nijmegen Electrotechnische Fabrieken N.V., Nijmegen, Netherlands
Filed Sept. 24, 1969, Ser. No. 860,724
Claims priority, application Netherlands, Sept. 25, 1968, 6813678
Int. Cl. E16h 27/02, 29/00
U.S. Cl. 74—116
3 Claims

ABSTRACT OF THE DISCLOSURE

A switch driven by an energy accumulator of the crankshaft-spring type via a rotatable disc having equi-angularly spaced slots and via a driving member cooperating with said disc and driven by a shaft, said driving member temporarily engaging each time, during its movement, a slot of said disc to take the latter along for its stepwise rotation, and in which the movable switch part is positively coupled with said disc and the crankshaft is positively coupled with said driving member via two cooperating elliptical toothed wheels.

Figure 1:
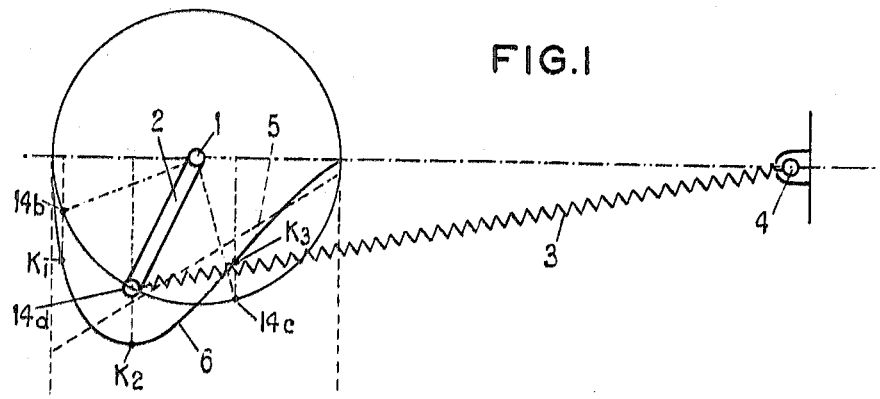

The invention relates to a switch driven by a stretchable energy accumulator of the crankshaft-spring type through a rotatable disc having equi-angularly spaced slots and through a driving member cooperating with said disc and driven by a shaft, said driving member temporarily engaging each time, during its movement a slot of said disc to take the latter along for its stepwise rotation, and in which the movable part of the switch is positively coupled with said disc and the crankshaft of the energy accumulator is positively coupled with said driving member.

The mentioned disc may be a Maltese cross, with which a driving member provided with a driving pin adapted to be moved in a circular path about an axis cooperates. However, said disc may also be constructed as a cup disc provided in its rim with slots or holes, into which a driving pin and a locking pin are alternately forced, said pins being adapted to be moved to and fro in substantially radial direction in respect of the cup disc by an eccentric attached to the driving shaft (see the book "Ingenious Mechanisms for Designers and Inventors," volume II, page 66, by Franklin D. Jones, 11th edition, 1957). Both disc-driving-member systems to convert a rotary movement of a driving shaft into a stepwise angular movement of a driven shaft are generally known, so that they will not be described any further.

Switches driven by a stretchable energy accumulator of the crankshaft-spring type are disclosed in "Smit Mededelingen," 4th volume, No. 4, pages 88–92, 1949 and in the Dutch patent specification 76,651. A disadvantage of the energy accumulator of the crankshaft-spring type is, that during the active stroke of 180° thereof the torque exerted on the driving crankshaft by the spring increases from zero to a maximum and decreases again from said maximum to zero, so that only during a part of the stroke of 180° a sufficient torque can be exerted on the disc to be driven by the driving member. In order to give said torque a satisfactory value in a greater part of the stroke of 180°, a fly wheel has been mounted on the crankshaft (see the Dutch patent specification 76,651). Such a fly wheel requires additional material, weight and space as well as a heavy structure which is capable to stop the fly wheel at the right moment.

The invention has the object to provide a switch driven by an energy accumulator of the crankshaft-spring type, in which the disadvantages of the known driving systems are avoided in a simple manner. It consists in that the crankshaft and the driving member are coupled by means of two cooperating elliptical or substantially elliptical toothed wheels. By means of elliptical toothed wheels the transmission ratio between the two shafts coupled by said toothed wheels with a mean transmission ratio of 1:1 can be varied within each revolution, so that for an active stroke of the driving member of 180° the crankshaft need be rotated through a considerably smaller angle. The positions of the elliptical toothed wheels are then so chosen in respect of their shafts, that during the rotation of the crankshaft through said smaller angle the spring exerts a great torque on the crankshaft.

Preferably the driving mechanism of the switch is so constructed, that the toothed wheels are equal accurately elliptical toothed wheel, which each rotate about a focus of their ellipse, one toothed wheel being attached to the crankshaft in such a position, that, when the crank is in the position, in which the torque exerted by the spring on the crankshaft is maximum or nearly maximum, said toothed wheel is directed with its longest radius extending from its axis of rotation towards the axis of the disc, and the other toothed wheel being attached to the driving shaft of the driving member in such a position, that the line of connection between said driving shaft and the driving member, when the latter has penetrated during its active stroke a slot of the disc to the maximum extent, coincides with the longest radius extending from the axis of rotation of said toothed wheel. By means of thus mounted elliptical toothed wheels it is easily possible to obtain during the active stroke of the driving member the most favourable transmission ratio between the crankshaft and the driving member. In this case it is advantageous to give the elliptical toothed wheels such a shape, that the longest radius extending from the axis of rotation is somewhat longer than the shortest radius extending from said axis. Then a transmission ratio of about 2:1 is obtained during the active stroke of the crankshaft, so that the crankshaft then need to rotate only through 90° in order to drive the driving member through an angle of 180°.

Figure 2:
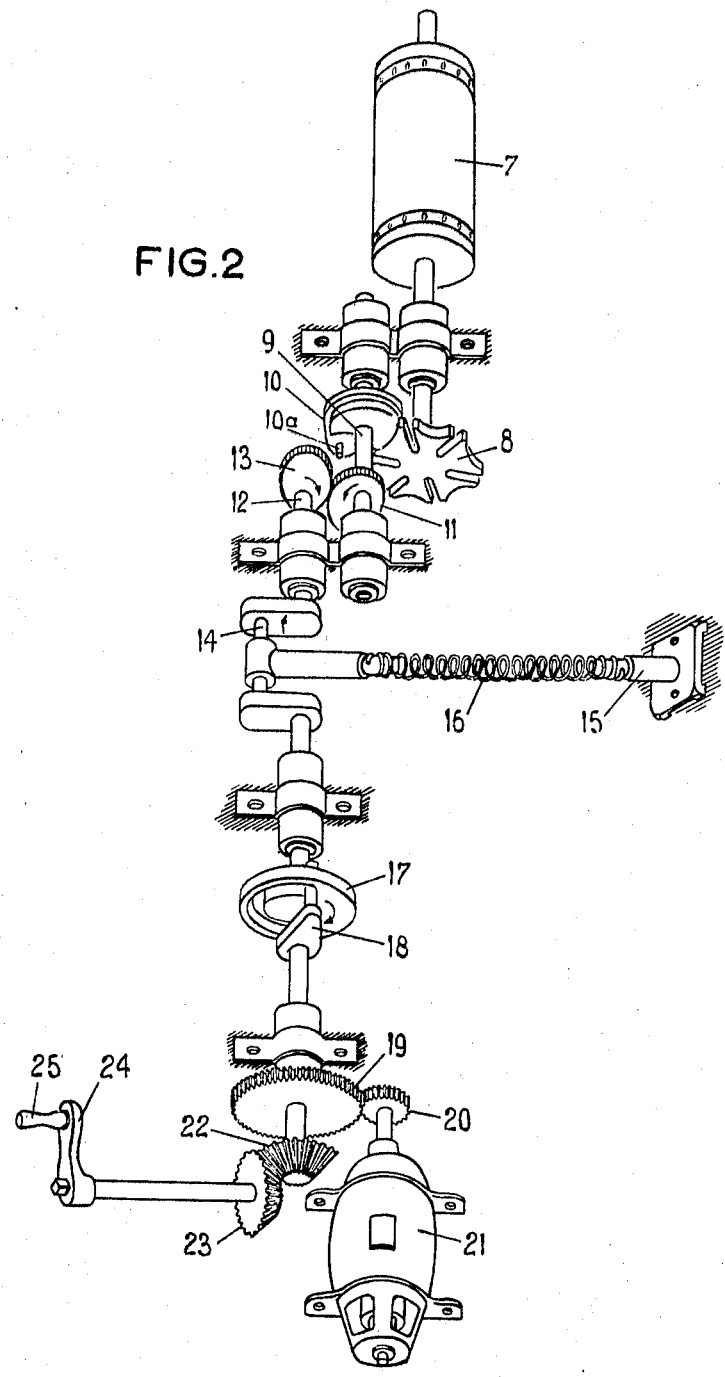

The invention will be further elucidated with the aid of the drawing. In the drawing:

FIG. 1 is a diagrammatical view of an energy accumulator of the crankshaft-spring type, in which the force of the spring and the torque exerted on the crankshaft are plotted against the angular movement of the crankshaft, FIG. 2 is a perspective view of a tap changer for a regulating transformer comprising a driving mechanism according to the invention and FIGS. 3, 4, 5 and 6 are illustrations of a portion of a Maltese cross cooperating with a driving member driven by elliptical toothed wheels.

In FIG. 1 a crankshaft is designated by 1 which is provided with a crank 2, to which the end of a spring 3 is connected, the other end of which is attached to a fixed point 4. When the crank 2 is rotated from the highest to the lowest dead centre the force of the spring decreases in accordance with the dotted line 5. The torque exerted by the spring on the crankshaft is indicated by the curve 6. In the shown position of the crank 2 this torque has about the maximum value.

In the switch and driving mechanism shown in FIG. 2 the part of a tap changer for a regulating transformer comprising the rotatable switching contacts is designated by 7. Attached to the shaft of the switch part 7 is a Maltese cross, with which a driving member provided with a driving pin 10a and mounted on an intermediate shaft 9 cooperates. Attached to the intermediate shaft 9 is an elliptical toothed wheel 11 which cooperates with an equal elliptical toothed wheel 13 mounted on a crankshaft 12. The crankshaft 12 has a crank 14, to which an end of a spring 16 is connected, the other end of which is attached to a fixed part 15. The crankshaft 12 is coupled through a coupling 17, 18 having a free stroke of 180° with a shaft 26 which is adapted to be driven through toothed wheels 19, 20 by a motor 21 and through toothed wheels 22, 23 by a crank 24 provided with a handle 25.

As soon as the spring has been stretched by the motor 21 or by means of the handle 25 and the crank 14 has just passed its highest dead centre, the spring pulls the crank back to the lowest dead centre which is made possible by the free stroke of 180° of the coupling 17, 18 without the motor 21 or the handle 25 being taken along. During this movement of the crankshaft caused by the energy accumulator 14, 16 the intermediate shaft 9 and the driving member 10 are rotated through the elliptical toothed wheels 13 and 11 with varying velocity. Due thereto the pin 10a of the driving member comes into engagement with a slot of the Maltese cross 8 and the switch part 7 is rotated on one step. From FIGS. 3, 4, 5 and 6 it appears that, when the elliptical toothed wheels are equal accurately elliptical toothed wheels, which are each adapted to rotate about a focus of their ellipse and are mounted in predetermined positions on the intermediate shaft 9 and the crankshaft 12, a very satisfactory driving operation of the Maltese cross 8 is attained.

Figure 3:
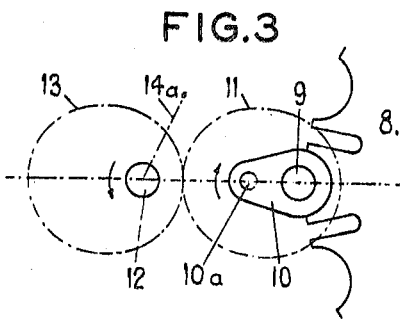

In the position shown in FIG. 3 the toothed wheels 11 and 13 have their long axes in alignment. This position is reached, when the crank 14 has arrived during the stretching of the spring 16 at the position 14a shown in dotted line in FIG. 3. The pin 10a of the driving member 10, which intersects at right angles the longest radius of the toothed wheel 11 extending from the intermediate shaft 9, is then completely free from the Maltese cross 8. After the crank 14 has arrived at its upper dead centre, the spring 16 pulls the crank back to its lower dead centre. During this movement the pin 10a of the driving member 10 arrives at the position shown in FIG. 4, in which said pin enters a slot of the Maltese cross 8, so that this cross is driven. In these positions of the toothed wheels 11, 13 and the driving member 10 the crank 14 is found in the position 14b shown in FIG. 4. The driving of the Maltese cross goes on till the pin 10a of the driving member 10 has reached the position shown in FIG. 6. In that position said pin leaves again the slot of the Maltese cross 8 and the crank 14 is in the position 14c. During the movement of the crank 14 from position 14b to position 14c it passes position 14d shown in FIG. 5. In that position the long axes of the toothed wheels are again in alignment and the toothed wheel 13 is directed with its longest radius extending from the crankshaft 12 towards the axis of the Maltese cross 8 whereas the pin 10a of the driving member 10 has penetrated to slot of the Maltese cross to the maximum extent.

Figure 4:
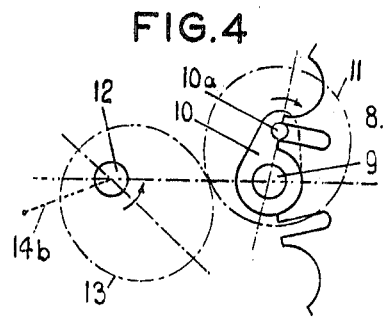
Figure 5:
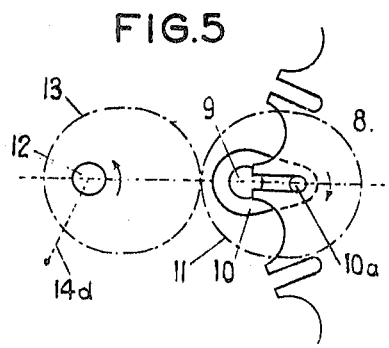
Figure 6:
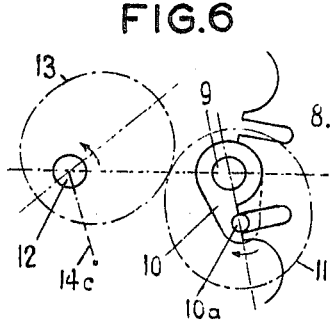

To the crank positions 14b, 14c and 14d shown in FIG. 4, FIG. 6 and FIG. 5 the crank posiitons 14b, 14c and 14d shown in FIG. 1 correspond. From the torque-crank-position curve 6 it appears that, when the crank is rotated from position 14b through position 14d to position 14c, the torque exerted by the spring 16 on the crank first increases from the value $K_1$ to the value $K_2$ and thereupon decreases from the value $K_2$ to the value $K_3$. It also appears that during the entire active stroke of the driving member 10 the torque exerted by the spring 16 exerts a relatively great torque to rotate on the Maltese cross 8 one step. It also appears that given the selected shape of the toothed wheels 11, 13 in which the longest radius is somewhat more than twice the shortest radius of each toothed wheel, the transmission ratio is, during the active stroke of the driving member, about 2:1, so that the crankshaft need to be rotated through about 90° to rotate the driving member through 180°. Another advantage of this construction is that during the active stroke of the driving member the velocity thereof is considerably increased, so that the changeover movement of the switch is effected with great velocity which is very favourable for the switch process.

What I claim is:

1. A switch driven by a stretchable energy accumulator of the crankshaft-spring type through a rotatable disc having equiangularly spaced slots and through a driving member cooperating with said disc and driven by a shaft, said driving member temporarily engaging each time, during its movement, a slot of said disc to take the latter along for its stepwise rotation, and in which the movable part of the switch is positively coupled with said disc and the crankshaft of the energy accumulator is positively coupled with said driving member, characterized in that the crankshaft and the driving member are coupled by means of two cooperating elliptical or substantially elliptical toothed wheels.

2. A switch according to claim 1, characterized in that the toothed wheels are equal accurately elliptical toothed wheels, which each rotate about a focus of their ellipse, one toothed wheel being attached to the crankshaft in such a position, that, when the crank is in the position, in which the torque exerted by the spring on the crankshaft is maximum or nearly maximum, said toothed wheel is directed with its longest radius extending from its axis of rotation towards the axis of the disc, and the other toothed wheel being attached to the driving shaft of the driving member in such a position, that the line of connection between said driving shaft and the driving member, when the latter has penetrated during its active stroke a slot of the disc to the maximum extent, coincides with the longest radius extending from the axis of rotation of said toothed wheel.

3. A switch according to claim 2, characterized in that in each toothed wheel the longest radius extending from the axis of rotation is somewhat longer than the shortest radius extending from said axis.

References Cited
UNITED STATES PATENTS

| 2,344,757 | 3/1944 | Weisberger | 74—437 |
| 2,552,572 | 5/1951 | Mikina | 74—437 |
| 2,757,569 | 8/1956 | Isom | 74—112 |
| 2,980,326 | 4/1961 | Crooke | 74—112 |

FOREIGN PATENTS

| 352,729 | 4/1961 | Switzerland | 74—436 |

FRED C. MATTERN, JR., Primary Examiner

W. S. RATLIFF, JR., Assistant Examiner

U.S. Cl. X.R.

74—437, 436